United States Patent [19]

Sezai

[11] Patent Number: 5,296,864
[45] Date of Patent: Mar. 22, 1994

[54] BEAM COMPRESSION PROCESS FOR ANTENNA PATTERN

[75] Inventor: Toshihiro Sezai, Tokyo, Japan

[73] Assignee: National Space Development Agency of Japan, Tokyo, Japan

[21] Appl. No.: 39,820

[22] Filed: Mar. 30, 1993

[30] Foreign Application Priority Data

Apr. 22, 1992 [JP] Japan .................. 4-127928

[51] Int. Cl.⁵ .......................... G01S 3/16; G01S 3/28
[52] U.S. Cl. .................................................. 342/382
[58] Field of Search .............................. 342/372, 382

[56] References Cited

FOREIGN PATENT DOCUMENTS 0358342  3/1990  European Pat. Off. .
0532201A1  3/1993  European Pat. Off. .

*Primary Examiner*—Theodore M. Blum
*Attorney, Agent, or Firm*—Armstrong, Westerman, Hattori, McLeland & Naughton

[57] ABSTRACT

An antenna system including a sub antenna adjacent a main antenna in the direction where a beam width of the main antenna is to be compressed and a beam axis of the sub antenna is coincident with a beam axis of the main antenna. Antenna beams of the antenna system are scanned in the direction of compression of the beam width. Received signals of the main antenna and the sub antenna are subjected to a step of signal processing and multiplication process in a signal processing and multiplying circuit. In that step, only when the received pattern waveform of the main antenna and the received pattern waveform of the sub antenna are both at local maximum levels, the received signal of the sub antenna is output and subjected to the multiplication process for preventing the occurrence of distortion in the received pattern.

3 Claims, 5 Drawing Sheets

BEAM COMPRESSION PROCESS FOR ANTENNA PATTERN

BACKGROUND OF THE INVENTION

1. Field of the Invention

The present invention relates to a beam compression process for an antenna pattern which eliminates distortions of a received pattern produced during a process of compressing an antenna pattern of antennas, to thereby improve beam compression performance.

Generally, a beam width is one of indices of quality of antenna patterns of receiving antennas and so forth. The smaller the beam width, the higher the performance of the antenna pattern. However, the beam width and the size (length) of an antenna are inversely proportional to each other. Thus, a reduction in the beam width increases the antenna size, while a reduction in the antenna size increases the beam width.

In an attempt to double the power of discriminating an object, i.e., resolution, in a radar antenna, for example, the beam width must be halved, typically in doubling of the antenna size. The doubled antenna size has various drawbacks, including an increase in not only the area occupied by the antenna, but also the weight of the antenna and dimensions of the antenna support structure. Conversely, if the antenna size is halved, the beam width is doubled and the discriminating power deteriorates to half of the original level.

It is well known that the beam width and the antenna size are contradictory to each other, as mentioned above. Since actual antennas are subjected to limitations in the area occupied by the antenna and other factors in most cases, practical compromises must be made to some extent in limiting beam width under such limitations.

For the purpose of improving the above problem, there has been conventionally known a beam compressing process using the principle of a multiplicative array in which the beam width is reduced by multiplying received signals of a plurality of antennas by each other. FIG. 1 is a diagram showing an antenna arrangement for carrying out such beam compression. Denoted by reference numeral 101 is a main antenna constituted by, for example, an array antenna comprising a plurality of radiation elements arrayed into the rectilinear form with equal intervals, and 102 is a sub antenna. The sub antenna 102 is arranged at a position spaced from the main antenna 101 in the X direction, i.e., the direction where a beam width is to be compressed. 103 is a multiplying circuit for multiplying a received signal of the main antenna 101 by a received signal of the sub antenna 102. In the antenna device thus arranged, the signals received by the antennas 101, 102 are input in phase to the multiplying circuit 103 and subjected to a multiplication process. As a result, a directional characteristic of the main antenna and a directional characteristic of the sub antenna are multiplied to give a synthetic directional characteristic with the beam width compressed therein.

However, the above-explained conventional beam compression process for an antenna pattern has the problem that although an identical effect to that resulted from beam compression can be obtained, a grating lobe of the sub antenna forms a received pattern indicative of a radio wave source is present, in spite of the absence of any radio wave source, i.e., thereby causing distortions in the received pattern.

SUMMARY OF THE INVENTION

The present invention is directed to solving the above problem in the conventional beam compression process, and its object is to provide a beam compression process for an antenna pattern by which no distortions are caused in a received pattern, while enabling compression of a beam width.

To achieve the above object, a beam compression process for an antenna pattern according to the present invention comprises the steps of providing an antenna system made up by a main antenna for receiving a radio wave and at least one sub antenna which is adjacent said main antenna in the direction where a beam width of said main antenna is to be compressed and which has a beam axis coincident with a beam axis of said main antenna; scanning antenna beams of said antenna system in said direction of compression of the beam width; and executing an in-phase multiplication process of received signals of said main antenna and said sub antenna, wherein the received signal of said sub antenna is output and subjected to said multiplication process for beam compression only when a received pattern waveform of said main antenna and a received pattern waveform of said sub antenna are both at local maximum levels.

In such a beam compression process for an antenna pattern, the antenna beams of the antenna system are scanned in the direction of compression of the beam width, and the received signals of the main antenna and the sub antenna are multiplied in-phase by each other, whereby the beam width is compressed based on the principle of a multiplicative array. In the step of multiplying the received signals, only when the received pattern waveform of the main antenna and the received pattern waveform of the sub antenna are both at local maximum levels. The received signal of the sub antenna is output and subjected to the multiplication process. As a result, distortions of the received pattern are removed.

More specifically, in the case of targeting a ratio wave source with discrete distribution like a radar, for example, a received pattern waveform of antennas is generally at a local maximum level near the angle at which the radio wave source is present, but not at local maximum level near the angle at which the radio wave source is absent. With the beam compression process based on the principle of a multiplicative array, there occurs a large grating lobe because the sub antenna is arranged at a position spaced from a rotary shaft for the scan. Accordingly, even near the angle at which the radio wave source is absent, the received pattern waveform becomes a local maximum level due to the radio wave received by the grating lobe. For that reason, if the received signals of the main antenna and the sub antenna are simply subjected to the multiplication process, distortions would cause in the received pattern.

However, when no radio wave sources are present in the direction of main beam of the main antenna and a radio wave source is present in the direction of grating lobe of the sub antenna, the received pattern waveform of the sub antenna is at a local maximum level, but the received pattern waveform of the main antenna is not at a local maximum level. In view of the foregoing, the present invention is arranged to output the received signal of the sub antenna and multiply it by the received signal of the main antenna, only when the received pattern waveform of the main antenna is at a local maximum level; and the received pattern waveform of the sub antenna is also at a local maximum level. It is thus possible to remove distortions of the received pattern.

DETAILED DESCRIPTION OF THE PREFERRED EXEMPLARY EMBODIMENT

Figure 1:
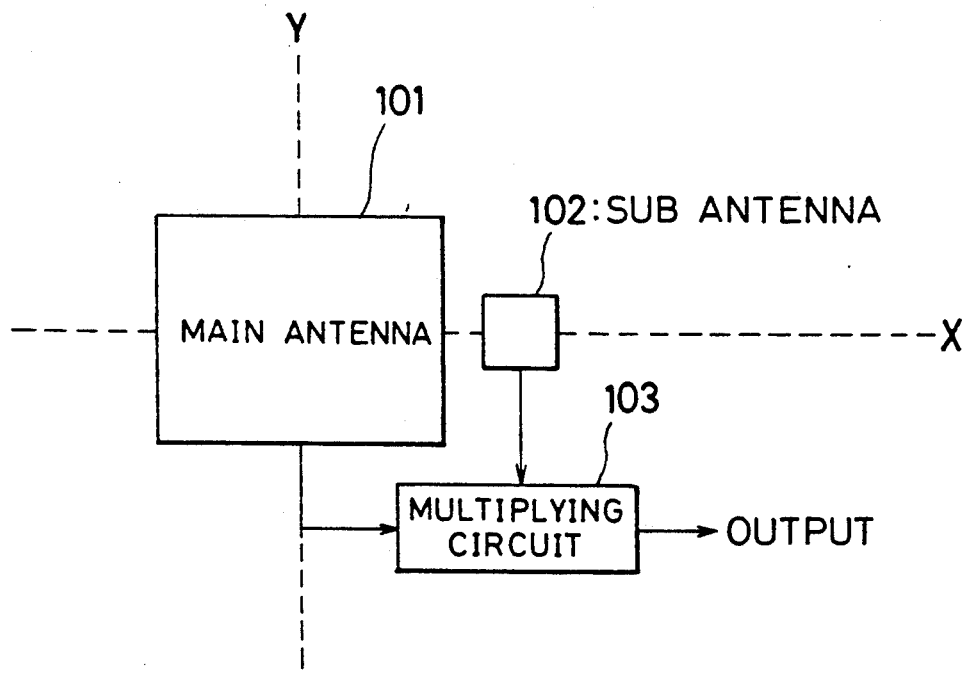
FIG. 1 is a conceptual diagram showing a conventional antenna device adapted for beam compression.
Figure 2:
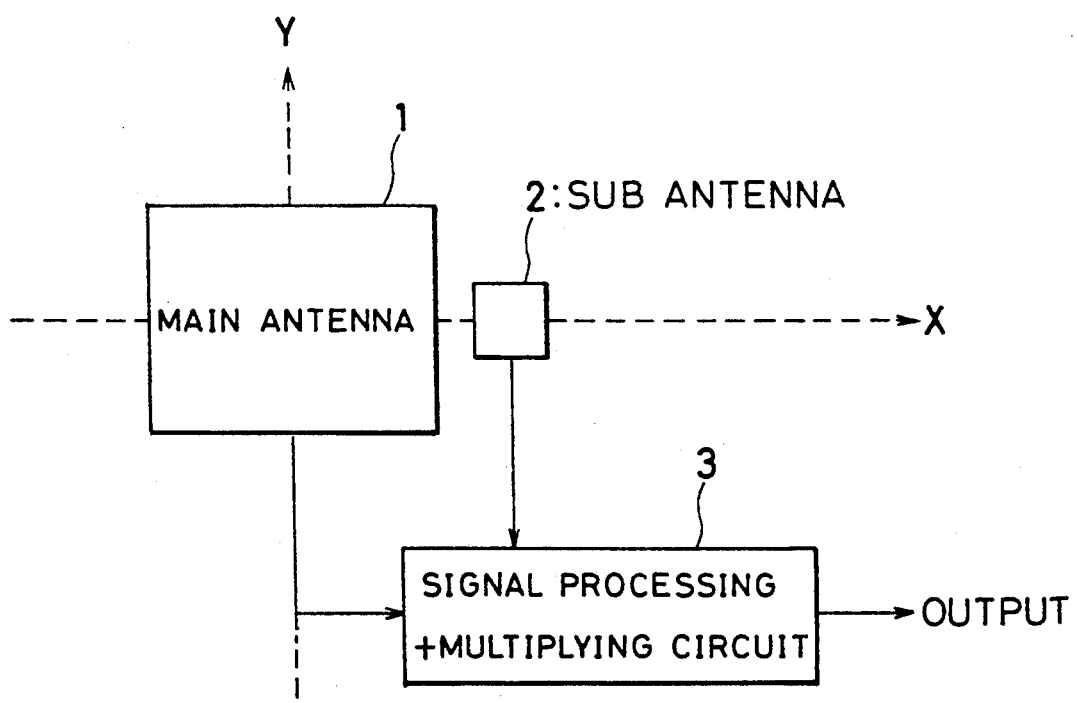
FIG. 2 is a conceptual diagram showing the schematic arrangement of an antenna device to explain one embodiment of a beam compression process for an antenna pattern according to the present invention.

One embodiment will be described below. FIG. 2 is a conceptual diagram showing the schematic arrangement of an antenna device to explain an embodiment of a beam compression process for an antenna pattern according to the present invention. In FIG. 2, denoted by reference numeral 1 is a main antenna for receiving a radio wave which comprises a horn antenna, an array antenna or the like. 2 is a sub antenna which may be of any type antenna such as a dipole antenna, a horn antenna and an array antenna. The sub antenna 2 is arranged adjacently to the main antenna 1 in the X direction, i.e., the direction where the beam width of a pattern of the main antenna 1 is to be compressed, and has a beam axis coincident with a beam axis of the main antenna 1. 3 is a signal processing and multiplying circuit for executing double differential processing of a received signal of the main antenna 1 and a received signal of the sub antenna 2, determining from the resulted sign whether or not the received pattern waveforms are at local maximum levels, and then multiplying the received signals by each other only when the received pattern waveforms of the main antenna and the sub antenna are both at local maximum levels.

In the antenna device thus arranged, when a radio wave arrives during the period in which the antenna beams are scanned, the main antenna 1 and the sub antenna 2 output received signals depending on the respective antenna patterns. These received outputs are subjected in phase to a step of signal processing and multiplication process in the signal processing and multiplying circuit 3. By obtaining an output of the multiplying circuit as a final output, as explained above before, the output due to the grating lobe of the sub antenna is removed and the beam is compressed. As a result, distortion caused by the grating lobe is removed from the output.

Figure 3A:
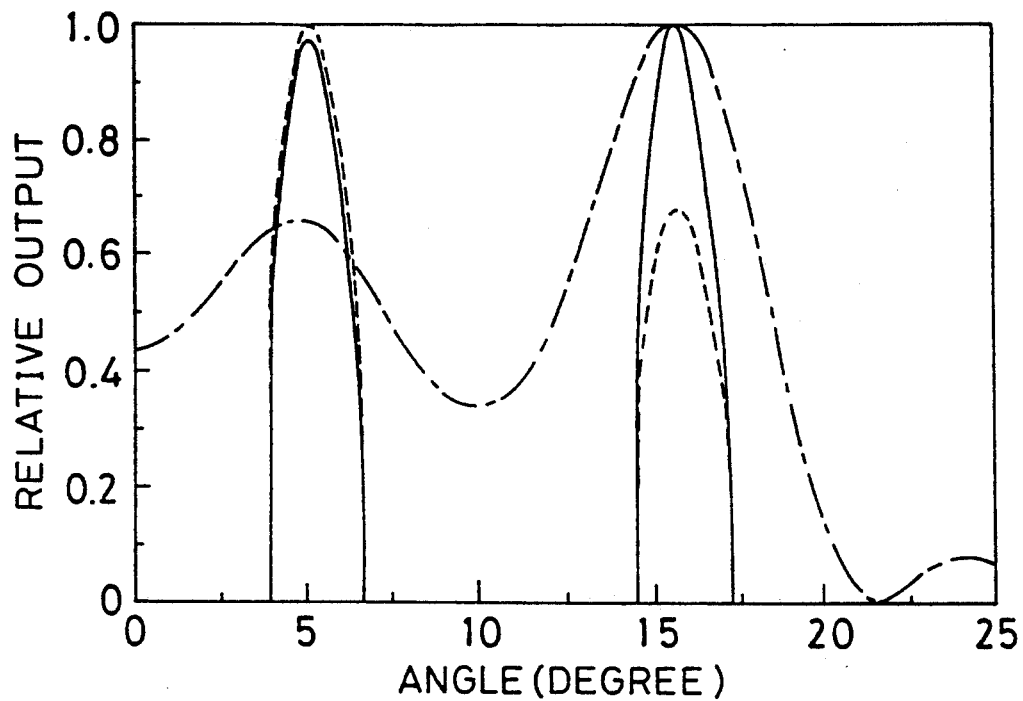
FIGS. 3A and 3B are graphs showing the simulation result of a synthetic pattern obtained by the antenna device used in the embodiment of the present invention and the simulation result of a synthetic pattern obtained by the antenna device used in the conventional beam compression, respectively.
Figure 3B:
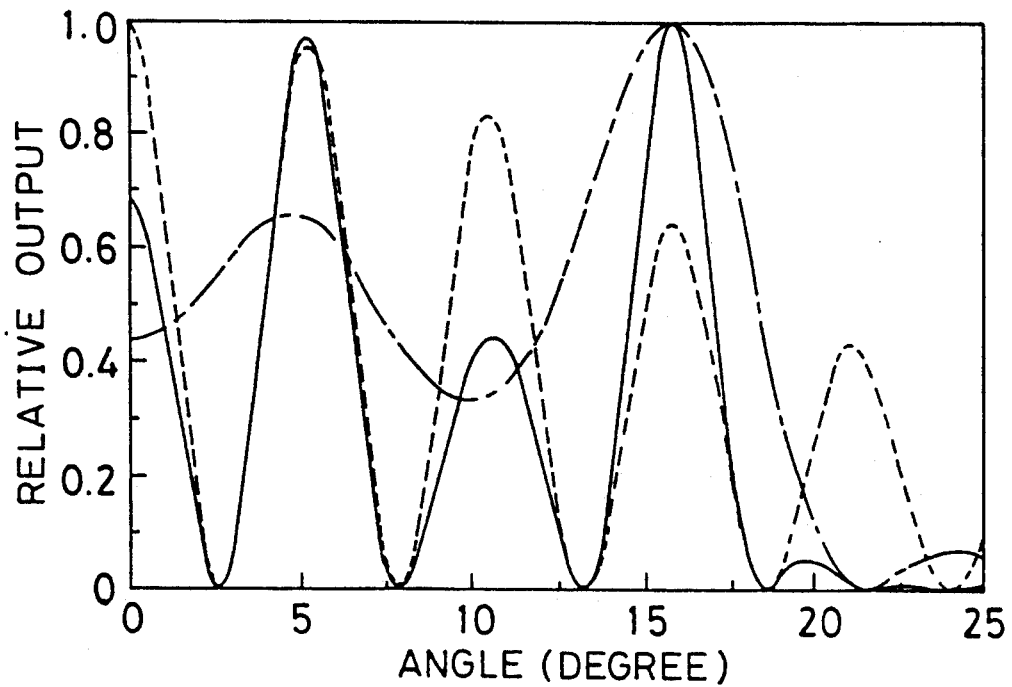

FIGS. 3A and 3B are graphs each showing the simulation result of a received power pattern obtained by scanning the antenna system which is made up by a main antenna comprising a rectangular antenna of uniform distribution with an antenna length in the scan direction being 10 times the received wavelength, and a sub antenna comprising a rectangular antenna of uniform distribution with an antenna length in the scan direction being 1 time the received wavelength, when the same spot radio wave source is present in each of the directions of +15 degrees, +5 degrees, −5 degrees and −15 degrees about an antenna's rotary shaft at a point spaced from the rotary shaft by an equal distance. It should be noted that the graphs indicate only the region of + direction because the spot radio wave sources are laterally symmetrical about 0 degree. FIG. 3A shows the pattern obtained by the beam compression process of the present invention, and FIG. 3B shows the pattern obtained by the conventional beam compression process. In these graphs, one-dot-chain lines represent a received power pattern of the main antenna, broken lines represent a received power pattern of the sub antenna, and solid lines represent a received power pattern obtained after multiplying the received signal of the main antenna by the received signal of the sub antenna, respectively, with maximum values of the respective patterns set as a reference. It will be found from the graphs of FIGS. 3A and 3B that the present beam compression process can remove distortions of the pattern which has been caused in the conventional process, and can provide the received power pattern corresponding to the antenna pattern with the beam width compressed narrower than that of the main antenna.

Figure 4:
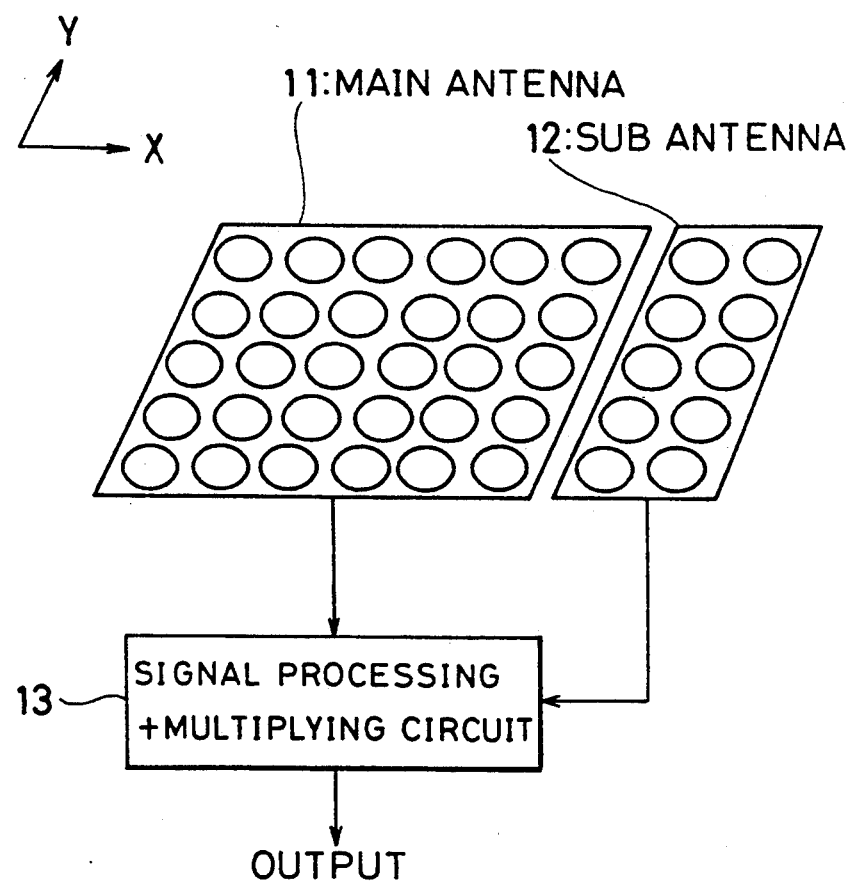
FIG. 4 is a perspective view showing one example of the practical arrangement of an antenna system of the antenna device used for practicing the present invention.

Next, one example of the practical arrangement of the antenna device will be described with reference to FIG. 4. In this example, the antenna system is made up by using a circular patch array antenna as each of main antenna 11 and a sub antenna 12. The sub antenna 12 is arranged at a position spaced from the main antenna 11 in the X direction.

A signal processing and multiplying circuit 13 can be implemented in an either digital or analog manner. In the case of adopting an analog manner, the double differential process can be executed by known techniques such as a differentiating circuit using a capacitor and a resistor. Determination of the double differential value can be executed by known techniques using a comparator. The multiplication process can be executed by known techniques such as a multiplying circuit or a frequency modulation circuit. In the case of adopting a digital manner, the signal processing and multiplying circuit 13 can be formed of such means based on known techniques as converting the received signals into digital signals by A/D converters and executing the double differentiation, the determination of the double differential value, and the multiplication by a computer.

Figure 5:
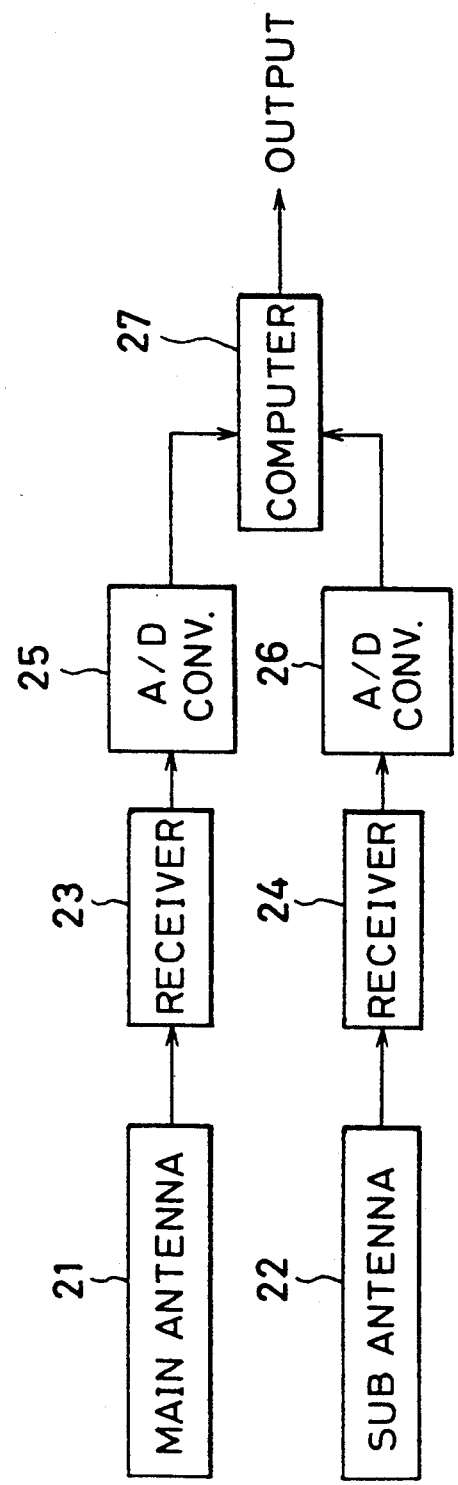
FIG. 5 is a block diagram showing one example of the practical arrangement of a signal processing and multiplying circuit.

One example of the digital circuit is shown in FIG. 5. Referring to FIG. 5, denoted by 21 is a main antenna, 22 is a sub antenna, 23, 24 are receivers for receiving radio waves caught by the antennas 21, 22, respectively, 25, 26 are A/D converters for converting outputs of the receivers 23, 24 into digital signals, respectively, and 27 is a computer for executing the double differentiation, the determination of the double differential value, and the multiplication for outputs of the A/D converters 25, 26.

In the circuit thus arranged, the radio waves received by the main antenna 21 and the sub antenna 22 are input to the receivers 23, 24 which output respective powers of the received radio waves in the form of DC signals. These outputs of the receivers 23, 24 are applied to the A/D converters 25, 26 for conversion into digital values which are then subjected to the double differentiation, the determination of the double differential value, and the multiplication in the computer 27, followed by outputting a multiplied value.

While the above embodiment is illustrated as using a single sub antenna, a plurality of sub antenna may instead be provided. Additionally, each of these sub antennas may be of any type antenna such as a dipole antenna, a horn antenna and an array antenna. The multiplication process in the case of using a plurality of sub antennas can be executed by any of two methods below. With the first method, outputs of the plurality of sub antennas are all added together and, thereafter, the resulting sum is multiplied by an output of the main antenna. In this case, the total received power of the sub antennas is increased, which results in a higher antenna gain and S/N ratio than using the single sub antenna. With the second method, outputs of the plurality of sub antennas are successively multiplied by an output of the main antenna. This method enables not only compression of the beam width, but also a reduction in the side lobe.

According to the present invention, as described above in conjunction with the embodiment, in the step of multiplying the received signals of the main antenna and the sub antenna by each other in phase, only when the received pattern waveform of the main antenna and the received pattern waveform of the sub antenna are both at a local maximum level, the received signal of the sub antenna is output and subjected to the multiplication process. As a result, it is possible to remove distortions of the received pattern which has been caused in the conventional beam compression, and also to compress the beam width of the main antenna.

What is claimed is:

1. A beam compression process for an antenna pattern for an antenna system including a main antenna for receiving a radio wave, at least one sub antenna which is adjacent said main antenna in the direction where a beam width of said main antenna is to be compressed and which has a beam axis coincident with a beam axis of said main antenna, and a signal processing and multiplying circuit connected to said main antenna and said sub antenna, comprising the steps of:

scanning antenna beams of said antenna system in said direction of compression of the beam width; and executing an in-phase multiplication process of received signals of said main antenna and said sub antenna, wherein the received signal of said sub antenna is output and subjected to said multiplication process by the signal processing and multiplying circuit only when a double differential coefficient of the received signal of said main antenna and a double differential coefficient of the received signal of said sub antenna are both negative.

2. A beam compression process for an antenna pattern according to claim 1, wherein said antenna system includes a plurality of said sub antennas, and said multiplication process step comprises the steps of:

adding the received signals of said sub antennas together; and multiplying the added total received signal of said sub antennas by the received signal of said main antenna.

3. A beam compression process for an antenna pattern according to claim 1, wherein said antenna system includes a plurality of said sub antennas, and said multiplication process step comprises the step of successively multiplying the received signals of said sub antennas by the received signal of said main antenna.

* * * * *